United States Patent [19]

Wang et al.

[11] Patent Number: 5,143,988

[45] Date of Patent: * Sep. 1, 1992

[54] HIGH REFRACTIVE-INDEX HYBRID MATERIAL PREPARED BY TITANIUM ALKOXIDE AND A PHOSPHINE CONTAINING OLIGOMER

[75] Inventors: Bing Wang; Garth L. Wilkes, both of Blacksburg, Va.

[73] Assignee: Virginia Tech Intellectual Properties, Inc., Blacksburg, Va.

[*] Notice: The portion of the term of this patent subsequent to Apr. 28, 2009 has been disclaimed.

[21] Appl. No.: 552,634

[22] Filed: Jul. 13, 1990

Related U.S. Application Data

[63] Continuation-in-part of Ser. No. 441,493, Nov. 27, 1989.

[51] Int. Cl.$^5$ ............................................ C08F 283/00
[52] U.S. Cl. .................................... 525/471; 525/534; 525/538
[58] Field of Search ...................... 525/471, 534, 538

[56] References Cited

U.S. PATENT DOCUMENTS 4,715,999 12/1987 Dislich et al. ..................... 264/1.1

OTHER PUBLICATIONS

Huang et al., ACS Symposium Series 1987, pp. 354–375.
H. Dislich, "Plastics as Optical Materials", Angew. Chem. Int. Ed. Engl. 18, 49–59 (1979).
B. Lintner et al., "A First Look at the Optical Properties of Ormosils", J. Non-Crystalline Solids 100 (1988), pp. 378–382.

*Primary Examiner*—Melvyn I. Marquis
*Attorney, Agent, or Firm*—Richard P. Fennelly; Louis A. Morris

[57] ABSTRACT

New hybrid materials have been prepared by combining a titanium alkoxide sol with high a refractive index phosphine oxide-containing oligomeric component (triethoylsilane-capped poly(arylene ether phosphine oxide). These materials are prepared by the sol-gel method. The final products are transparent and display high refractive index ($n_D = 1.66$–1.80). The refractive index of these hybrid materials display a linear relationship with titanium oxide content.

5 Claims, 2 Drawing Sheets

HIGH REFRACTIVE-INDEX HYBRID MATERIAL PREPARED BY TITANIUM ALKOXIDE AND A PHOSPHINE CONTAINING OLIGOMER

This is a continuation-in-part of U.S. Ser. No. 441,493, filed Nov. 27, 1989.

BACKGROUND OF INVENTION

It is sometimes important for coatings and optical systems to be transparent and possess a high refractive index. Sakai, H. et al. in Jpn. Kokai Tokkyo Koho JP 63/190733 describes formation of a high refractive index glass by a cation exchange method. Matsumaru, et al. in Jpn. Kokai Tokkyo Koho JP 61/163138 obtained a cadmium-thorium free optical glass. Matsumaru, et al. in Jpn. Kokai Tokkyo Koho JP 61/163137 obtained a high refractive index and good near-UV transmittance optical glass from a mixed oxide system. The disclosure of each of these references is limited, however, to inorganic-based glass systems which do not contain organic polymeric components.

Copending U.S. patent Ser. No. 418,367, Oct. 6, 1989, abandoned, by the instant inventors describes novel hybrid materials formed by the sol-gel method which describe a poly(tetramethyleneoxide) organic component.

Copending U.S. patent Ser. No. 441,493, Nov. 27, 1989 by the same inventors describes high refractive index hybrid materials also formed by the sol-gel method. This previous invention describes very high refractive index hybrid materials formed by the use of an organic polymeric component which was either a poly(arylene ether ketone) or poly(arylene ether sulfone). The refractive indices of poly(arylene ether ketone) and poly(arylene ether sulfone) are both, however, below 1.65, based on sodium line measurements.

BRIEF DESCRIPTION OF THE DRAWINGS

The Drawings further illustrate the invention wherein.

BRIEF DESCRIPTION OF INVENTION

Figure 1:
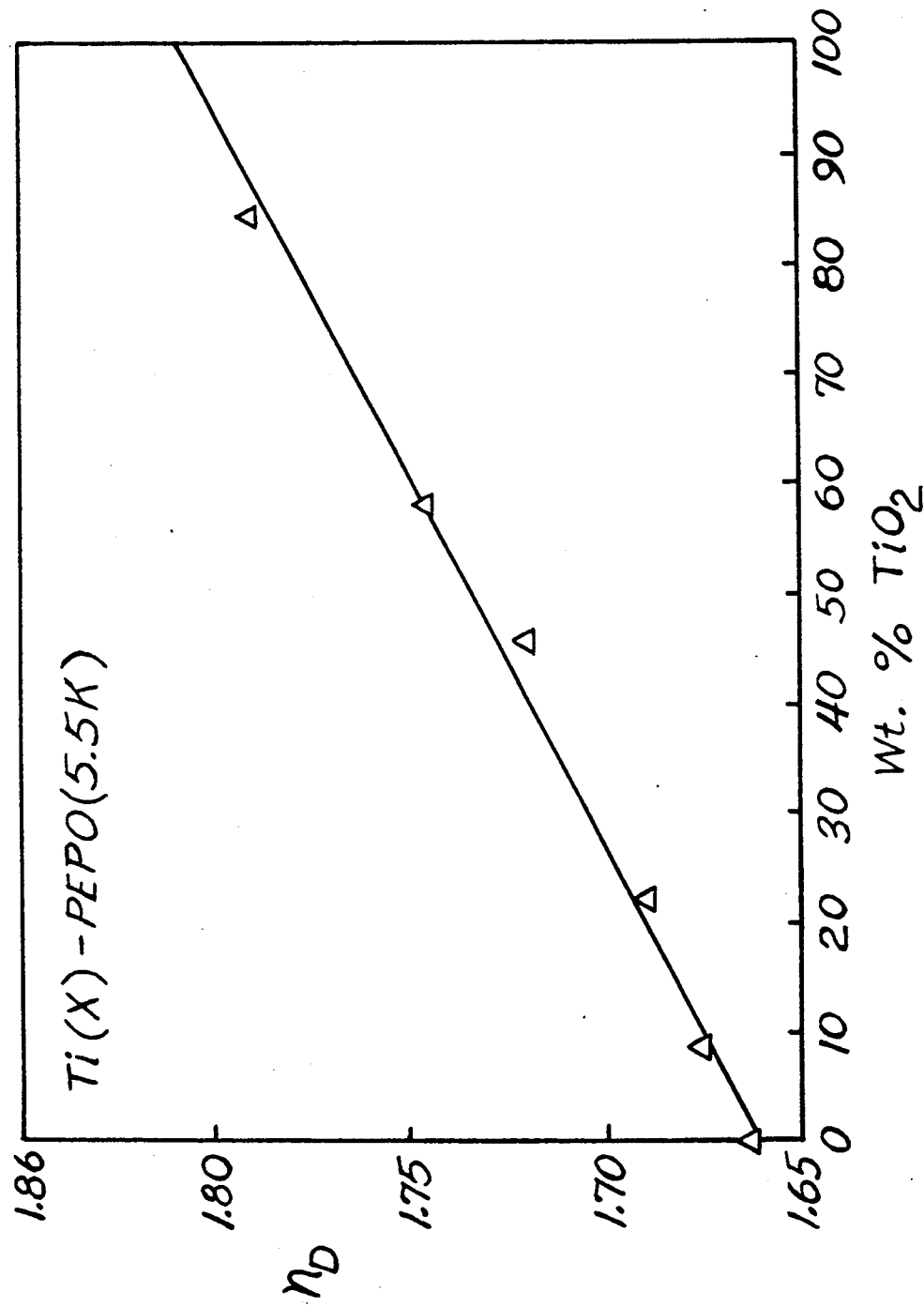
FIG. 1 is a plot of the refractive index of the novel Ti-poly(arylene ether phosphine oxide) oligomer (PEPO) hybrid materials versus their $TiO_2$ content, this data being obtained at 25° C. The weight % $TiO_2$ values in FIG. 1 were obtained using, in ascending order, 25%, 50%, 75%, 83% and 95%, by weight, of titanium tetraisopropoxide in formation of the materials.
Figure 2:
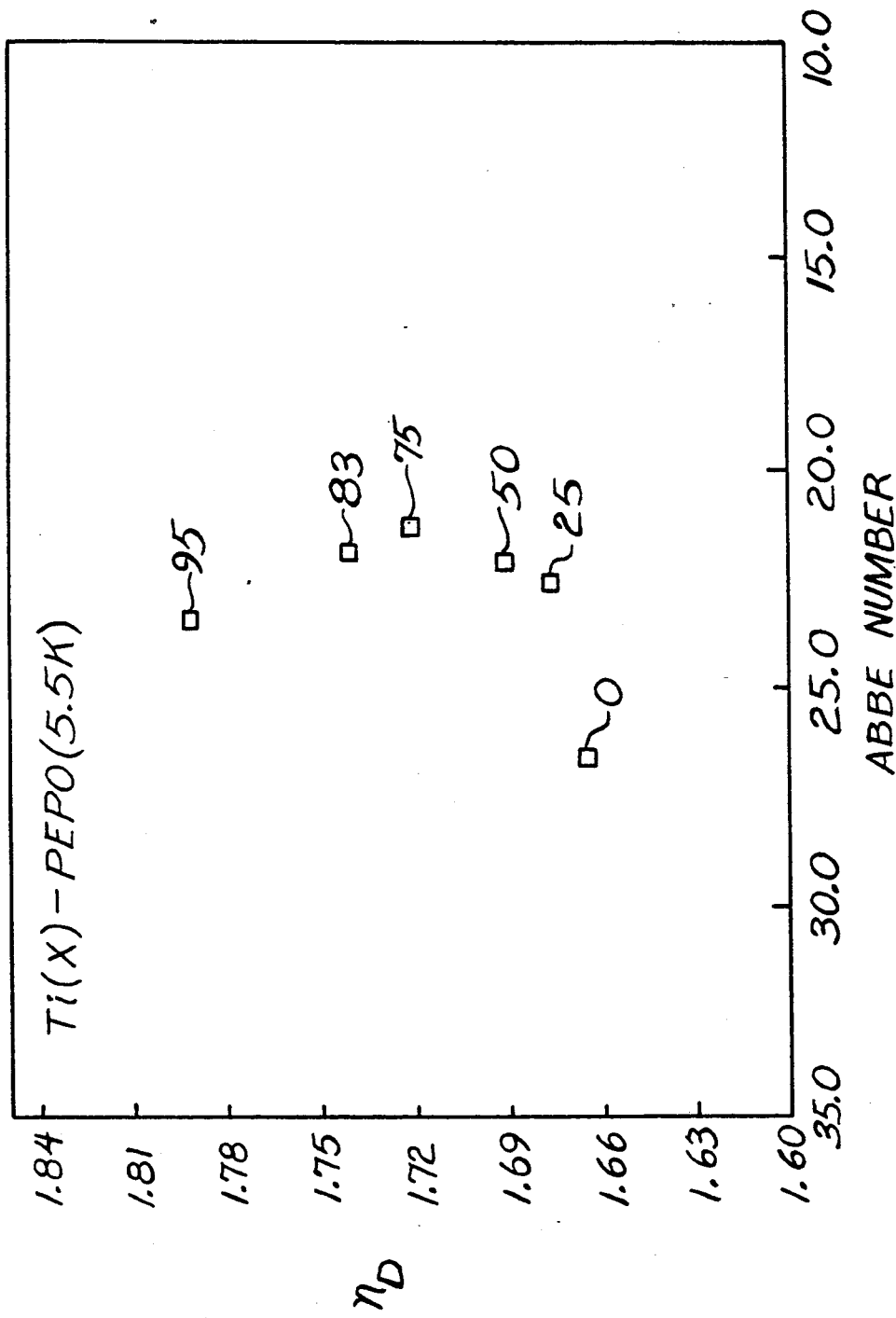
FIG. 2 is the optical dispersion data of the Ti-PEPO hybrid materials represented as a plot of the refractive index ($n_D$) versus the abbe number.

A series of new hybrid materials are the subject of this invention and are formed by combining a titanium alkoxide sol and a very high refractive index organic polymeric component which is a trialkoxysilane-capped poly(arylene ether phosphine oxide). The trialkoxysilane moiety is a tri(lower alkoxy)silane moiety such as triethoxysilane. This combination is treated using conventional sol-gel chemistry to hydrolytically cocondense the alkoxide and trialkoxysilane-capped organic component. The final products are transparent and have a high refractive index ($n_D$=1.66-1.79). The refractive index of these novel hybrid materials display a linear relationship with the titanium oxide content. The titanium oxide content of the hybrid materials can preferably range from about 5% to about 95% by weight of the entire composition.

The following Examples illustrate certain embodiments of the instant invention.

EXAMPLE 1

This Example illustrates preparation of an triethoxysilane-capped poly(arylene ether phosphine oxide)(PEPO) material:

First, 10 g of poly(arylene ether phosphine oxide) material (PEPO) of mol. wt. 5500 and having amine end groups and of the formula:

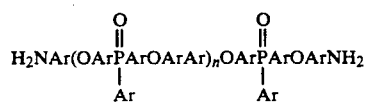

where $NH_2$ is in the meta position and Ar represents phenyl, was dissolved under nitrogen and stirring in a mixed solvent which included 30 wt % of dimethylformamide and 70 wt % of tetrahydrofuran (THF). Copending U.S. Ser. No. 552,635, filed on even date herewith, entitled "Novel Amine-Terminated Poly-(Arylene Ether Phosphine Oxide) Oligomers" describes how these materials can be formed by nucleophilic aromatic substitution step polymerization of a bisphenol monomer, a dihalo triphenyl phosphine oxide monomer, and an aminophenol and this disclosure is incorporated herein by reference for that purpose. Next, 1.12 g (1.25 eq mole) of 3-isocyanatopropyltriethoxysilane was slowly added to the solution. The solution was stirred under nitrogen at room temperature for three hours, then 200 ml of absolute ethanol was added to the solution to precipitate the triethoxysilane capped poly(arylene ether phosphine oxide). After filtering, the final solid product was dried under vacuum at room temperature.

EXAMPLE 2

This Example illustrates preparation of Ti-PEPO "ceramers" (hybrid material) as follows:

First, 0.1 ml of HCl (10N), and 5 g of THF were mixed together in a flask. Then, the solution was transferred to an addition funnel. Next, this solution was then slowly added to a polypropylene flask, which contained 5 g of titanium isopropoxide. In order to avoid local inhomogeneity, it was crucial to maintain a slow addition rate of the HCl which contained the THF solution and also to utilize a fast stirring rate. By this procedure, a clear titania sol (pH=2.2) is formed. The solution was kept at room temperature for 24 hours. Then, a solution containing a 5 g of triethoxysilane-capped poly(arylene ether phosphine oxide), from Example 1, in 50 ml of mixing solvent (30 wt % DMF+70 wt % THF) was mixed with the titania sol and was stirred for five minutes to obtain a homogeneous system. The final solution was then cast into petri dishes and covered for further drying and curing at 60° C. for 24 hours. Films were later removed from the dishes after twelve hours and were annealed at 250° C. for twenty minutes to complete the curing of these hybrid materials.

The foregoing Examples are illustrative of certain embodiments of the invention and should not, therefore, be construed in a limiting sense. The scope of protection sought is set forth in the claims which follow.

We claim:

1. An inorganic/organic hybrid material having transparency and a refractive index of no less than about 1.65 which comprises the sol-gel derived, hydrolytically cocondensed reaction product of a titanium alkoxide and a trialkoxysilane-capped poly(arylene ether phosphine oxide).

2. A material as claimed in claim 1 wherein the titanium alkoxide is titanium isopropoxide.

3. A material as claimed in claim 1 wherein the titanium oxide content of the material ranges from about 5% to about 95%, by weight.

4. A material as claimed in claim 1 wherein the trialkoxysilane moiety is triethoxysilane.

5. A material as claimed in claim 1 wherein the titanium alkoxide is titanium isopropoxide and the trialkoxysilane-capped poly(arylene ether phosphine oxide) is triethoxysilane-capped.